US010899349B2

(12) United States Patent
Voorheis

(10) Patent No.: US 10,899,349 B2
(45) Date of Patent: Jan. 26, 2021

(54) CENTERING A VEHICLE IN A LANE USING ENVIRONMENTAL INFORMATION TO CORRECT A PREDICTED TRAJECTORY

(71) Applicant: Robert Bosch GmbH, Stuttgart (DE)

(72) Inventor: Thomas Voorheis, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 15/950,923

(22) Filed: Apr. 11, 2018

(65) Prior Publication Data
US 2019/0193730 A1 Jun. 27, 2019

Related U.S. Application Data

(60) Provisional application No. 62/610,623, filed on Dec. 27, 2017.

(51) Int. Cl.
*B60W 30/12* (2020.01)
*B60W 40/04* (2006.01)
(Continued)

(52) U.S. Cl.
CPC ............ *B60W 30/12* (2013.01); *B60W 40/04* (2013.01); *B60W 40/10* (2013.01); *B60W 50/0097* (2013.01); *B60W 50/0225* (2013.01); *B60W 2050/0086* (2013.01); *B60W 2050/0215* (2013.01); *B60W 2420/42* (2013.01); *B60W 2420/52* (2013.01); *B60W 2510/20* (2013.01); *B60W 2520/105* (2013.01); *B60W 2520/125* (2013.01); *B60W 2520/28* (2013.01); *B60W 2556/50* (2020.02)

(58) Field of Classification Search
CPC ......... B60W 30/12; B60W 2050/0063; B60W 40/04; B60W 50/0097; B60W 50/0225
USPC ........................................ 701/28, 33.1, 29.7
See application file for complete search history.

(56) References Cited

U.S. PATENT DOCUMENTS 7,162,333 B2   1/2007  Koibuchi et al.
8,332,134 B2  12/2012  Zhang et al.
(Continued)

OTHER PUBLICATIONS

International Search Report for Application No. PCT/EP2018/086092 dated Apr. 17, 2019 (5 pages).

*Primary Examiner* — Isaac G Smith
(74) *Attorney, Agent, or Firm* — Michael Best & Friedrich LLP

(57) ABSTRACT

A method and system for centering a vehicle in a lane. The system includes an electromagnetic radiation sensor, a motion sensor, a steering system, and an electronic controller. The electronic controller is configured to receive environmental information regarding an environment external to the vehicle from the electromagnetic radiation sensor and to receive a first motion of the vehicle from the motion sensor. The electronic controller is also configured to determine a predicted position of the vehicle based the first motion of the vehicle and the environmental information, store the predicted position, compare the predicted position to a desired position of the vehicle to generate and send a corrective signal to the steering system. The electronic controller is further configured to determine a current position of the vehicle, compare the current position with the predicted position to generate a difference, and calibrate the motion sensor based on the difference.

12 Claims, 5 Drawing Sheets

(51) Int. Cl.
*B60W 40/10* (2012.01)
*B60W 50/00* (2006.01)
*B60W 50/02* (2012.01)

(56) References Cited

U.S. PATENT DOCUMENTS

| | | |
|---|---|---|
| 8,346,437 B2 | 1/2013 | Hawakawa et al. |
| 8,352,112 B2 | 1/2013 | Mudalige |
| 2011/0231095 A1 | 9/2011 | Nakada et al. |
| 2013/0253767 A1* | 9/2013 | Lee .................. B60W 50/04 701/42 |
| 2016/0091325 A1 | 3/2016 | Takamatsu et al. |
| 2016/0176398 A1 | 6/2016 | Prokhorov et al. |

* cited by examiner

CENTERING A VEHICLE IN A LANE USING ENVIRONMENTAL INFORMATION TO CORRECT A PREDICTED TRAJECTORY

FIELD

Embodiments relate to an automated steering for vehicles.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially viable scale.

SUMMARY

One goal for an automatic steering vehicle is to be able to accurately measure the dynamics of the vehicle in order to predict the future position of the vehicle. For lateral dynamics, the sensors that can be used to predict the vehicle motion include a steering angle sensor, MEMS gyroscopes, and accelerometers. There are many reasons why a motion sensor is not always able to accurately measure the real motion of the vehicle. There are known drift effects that cause MEMS-based inertial sensors to lose accuracy. Differences in the position of the vehicle parts due to cornering, tire inflation, or road banking may cause a yaw rate sensor to measure motion that is not parallel with the ground plane as lateral motion. Similarly, for steering angle based sensing there are additional external forces that are not measured causing systemic error when the sensor is used to predict the future vehicle position. Embodiments described herein provide, among other things, an automatic steering system for a vehicle where a sensor signal (for example, from a gyroscope, a steering angle sensor, or an accelerometer) is used as the controlled signal of a closed-loop vehicle motion controller. To achieve robust control, vehicle motion that is requested or executed should be achieved. Environmental sensing can be used in combination with a motion sensor to determine the true motion of the vehicle and correct for system errors.

For driving in a linear vehicle dynamics range, it is usually sufficient to make single-track assumptions to determine the correct steering angle to achieve the desired vehicle reaction. Such assumptions rely on being able to accurately sense the position of the steering system of a vehicle. Since the position of the steering system is normally measured only in one place, in vehicles where there is significant play in the mechanical design of the steering system, or the configuration of the steering system can change dynamically (for example, in a vehicle equipped with an air suspension), the sensed steering angle may be inaccurate. One option is to model the mechanical behavior of the steering system. However, modeling typically requires significant software application effort for each mechanical design to which the model is adapted and potentially requires adaptation of system changes over time.

Embodiments provide, among other things, a system and a method for centering a vehicle in a lane.

One embodiment provides a system for centering a vehicle in a lane. The system includes an electromagnetic radiation sensor, a motion sensor, a steering system, and an electronic controller. The electronic controller is configured to receive environmental information regarding an environment external to the vehicle from the electromagnetic radiation sensor and to receive a first motion of the vehicle from the motion sensor. The electronic controller is also configured to determine a predicted position of the vehicle based on the first motion of the vehicle and the environmental information, store the predicted position of the vehicle in memory, compare the predicted position of the vehicle to a desired position of the vehicle to generate a corrective signal, and send the corrective signal to the steering system of the vehicle. The electronic controller is further configured to determine a current position of the vehicle, compare the current position of the vehicle with the predicted position of the vehicle to generate a difference, and calibrate the motion sensor based on the difference.

Another embodiment provides a method of centering a vehicle in a lane. The method includes sensing, with an electromagnetic radiation sensor, environmental information regarding an environment external to the vehicle and sensing, with a motion sensor, a first motion of the vehicle. The method also includes determining, with an electronic controller, a predicted position of the vehicle based on the first motion of the vehicle and the environmental information, storing the predicted position of the vehicle in memory, comparing the predicted position of the vehicle to a desired position of the vehicle to generate a corrective signal, and sending the corrective signal to a steering system of the vehicle. The method further includes determining a current position of the vehicle, comparing the current position of the vehicle with the predicted position of the vehicle to generate a difference, and calibrating the motion sensor based on the difference.

Other aspects, features, and embodiments will become apparent by consideration of the detailed description and accompanying drawings.

BRIEF DESCRIPTION OF THE DRAWINGS

FIG. 2 is the desired position.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
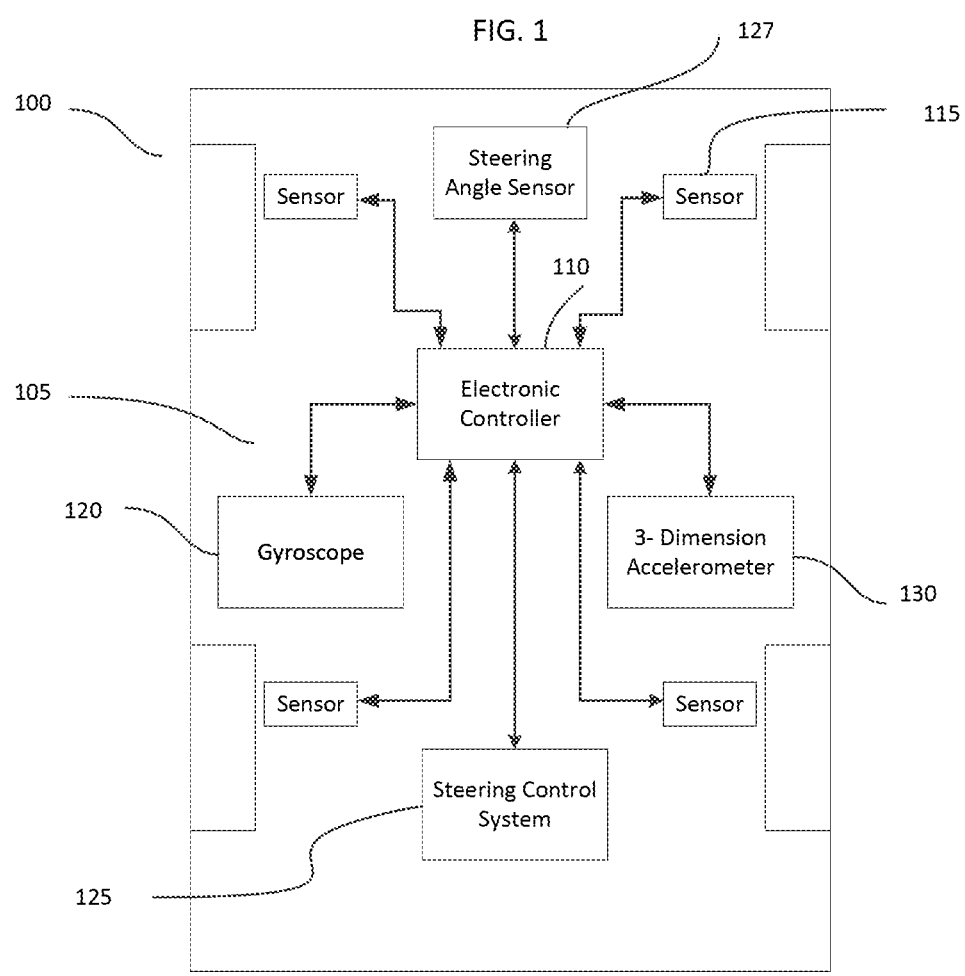
FIG. 1 is a block diagram of a vehicle equipped with a system for sensing and controlling the motion of the vehicle.
Figure 2:
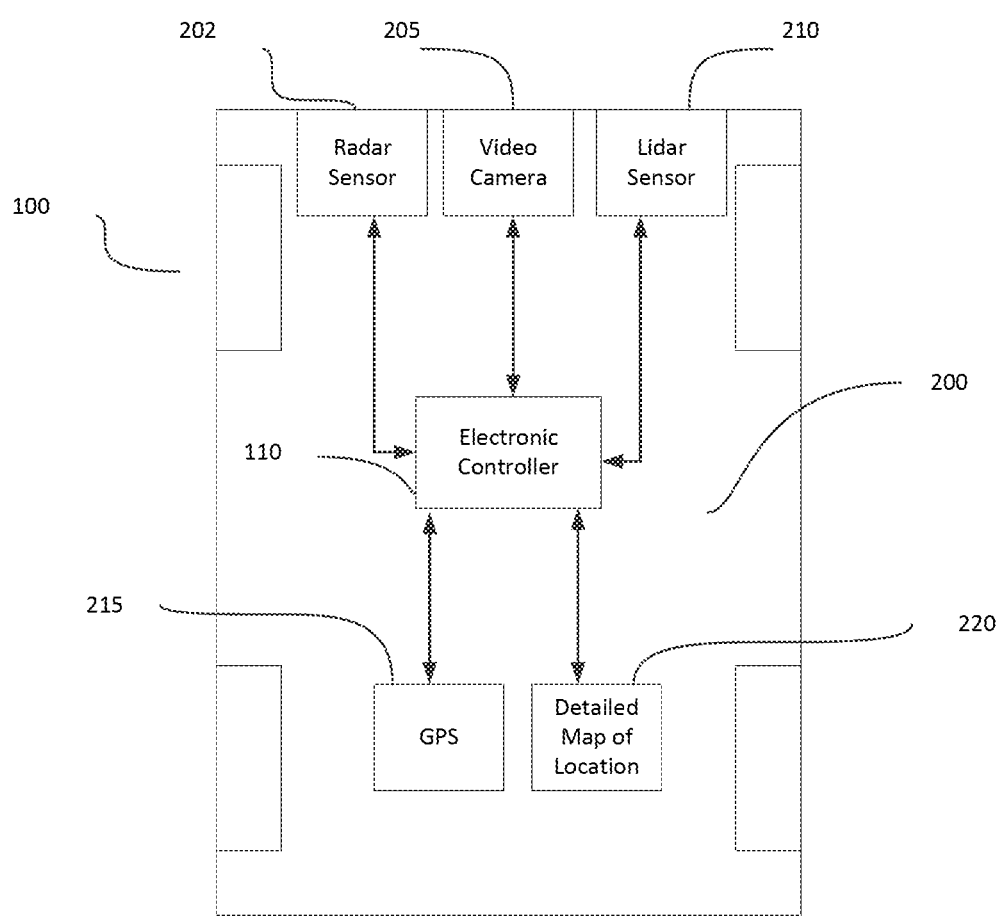
FIG. 2 is a block diagram of a vehicle equipped with a system for detecting the position of the vehicle relative to a surrounding environment.

FIG. 1 and FIG. 2 illustrate two subsystems of a single system used to center a vehicle 100 in a lane. FIG. 1 illustrates an example of the vehicle 100 equipped with a system 105 for sensing motion and controlling the vehicle's position. The vehicle 100, although illustrated as a four-wheeled vehicle, may encompass various types and designs of vehicles. For example, the vehicle 100 may be an automobile, a motorcycle, a truck, a bus, a semi-tractor, and others. The vehicle 100 includes at least some autonomous functionality, but may also require a driver or operator to perform driving functions. In the example illustrated, the system 105 includes several hardware components including an electronic controller 110, speed sensors 115, a gyroscope 120, a steering control system 125, steering angle sensor 127, and a three dimensional (or three-dimensional (3D)) accelerometer 130. The components of the system 105 may be of various constructions and may use various communication types and protocols.

The electronic controller 110 may be communicatively connected to speed sensors 115, gyroscope 120, steering control system 125, steering angle sensor 127, and three-dimensional accelerometer 130 via various wired or wireless connections. For example, in some embodiments, the electronic controller 110 is directly coupled via a dedicated wire to each of the above-listed components of the system 105 for sensing and controlling the vehicle's motion. In other embodiments, the electronic controller 110 is communicatively coupled to one or more of the components via a shared communication link such as a vehicle communication bus (for example, a controller area network (CAN) bus) or a wireless vehicle network.

The speed sensors 115 may be implemented, for example, using wheel speed sensors that sense rotational speed. In other embodiments, vehicle speed may be sensed or determined using other sensors alone or in combination with wheel speed sensors, for example, a transmission output speed sensor (TOSS) or other types of sensors. In the embodiment shown, a single speed sensor 115 is associated with each wheel of the vehicle 100. In another example, components of the system 105 may include a steering angle sensor 127, a steering actuator (for example, an electric motor of an electric steering system), and other components that directly or indirectly (for example, by differential braking) control the steering angle of the vehicle 100.

Each of the above-listed components of the system 105 may include dedicated processing circuitry including an electronic processor for receiving, processing, and transmitting data associated with the functions of each component. For example, the 3-dimensional accelerometer 115 may include an electronic processor that determines the parameters relating to the vehicle's directional motion. In this case, the 3-dimensional accelerometer 115 transmits the parameters or calculated values associated with the parameters to the electronic controller 110. Each of the components of the system 105 for sensing and controlling the vehicle's motion may communicate with the electronic controller 110 using various communication protocols. The embodiment illustrated in FIG. 1 provides but one example of the components and connections of the system 105 for sensing and controlling the vehicle's motion. However, these components and connections may be constructed in other ways than those illustrated and described herein.

FIG. 2 illustrates an example of the vehicle 100 equipped with a system 200 for sensing environmental information regarding an environment external to the vehicle 100. In the example illustrated, the system 200 includes several hardware components including an electronic controller 110, a radar sensor 202, a video camera 205, a lidar sensor 210, a global positioning system 215, and a map 220. The map 220 may be a map of a geographical area surrounding the vehicle 100, for example a map of an area with a radius of a predetermined size, for example, 1 kilometer. The components of the system 200 may be of various constructions and may use various communication types and protocols.

The electronic controller 110 may be communicatively connected to the radar sensor 202, video camera 205, lidar sensor 210, global positioning system 215, and map 220 via various wired or wireless connections. For example, in some embodiments, the electronic controller 110 is directly coupled via a dedicated wire to each of the above-listed components of the system 200 for sensing environmental information regarding an environment external to the vehicle 100. In other embodiments, the electronic controller 110 is communicatively coupled to one or more of the components via a shared communication link such as a vehicle communication bus (for example, a controller area network (CAN) bus) or a wireless vehicle network.

Each of the above-listed components of the system 200 for sensing environmental information regarding an environment external to the vehicle 100 may include dedicated processing circuitry including an electronic processor for receiving, processing, and transmitting data associated with the functions of each component. For example, the video camera 205 may include an electronic processor that determines the images to use to measure the accuracy of the system for sensing and controlling the vehicle's motion 105. In this case, the video camera 205 transmits the images or values associated with the images to the electronic controller 110. Each of the components of the system 200 for sensing environmental information regarding an environment external to the vehicle 100 may communicate with the electronic controller 110 using various communication protocols. The embodiment illustrated in FIG. 2 provides but one example of the components and connections of the system 200 for sensing environmental information regarding an environment external to the vehicle 100. These components and connections may be constructed in other ways than those illustrated and described herein.

The radar sensor 202, video camera 205, and lidar sensor 210 are electromagnetic radiation sensors. There may be more than one of each of the electromagnetic radiation sensors and they may be located at different positions on the interior or exterior of the vehicle 100. For example, the video camera 205, or components thereof, may be externally mounted to a portion of the vehicle 100 (such as on a side mirror or front end). Alternatively the video camera 205, or components thereof, may be internally mounted within the vehicle 100 (for example, positioned on the dashboard or by the rearview mirror). The electromagnetic radiation sensors are configured to receive signals indicative of the vehicle's distance from and position relative to, elements in the vehicle's surrounding environment 300 as the vehicle 100 moves from one point to another.

Figure 3:
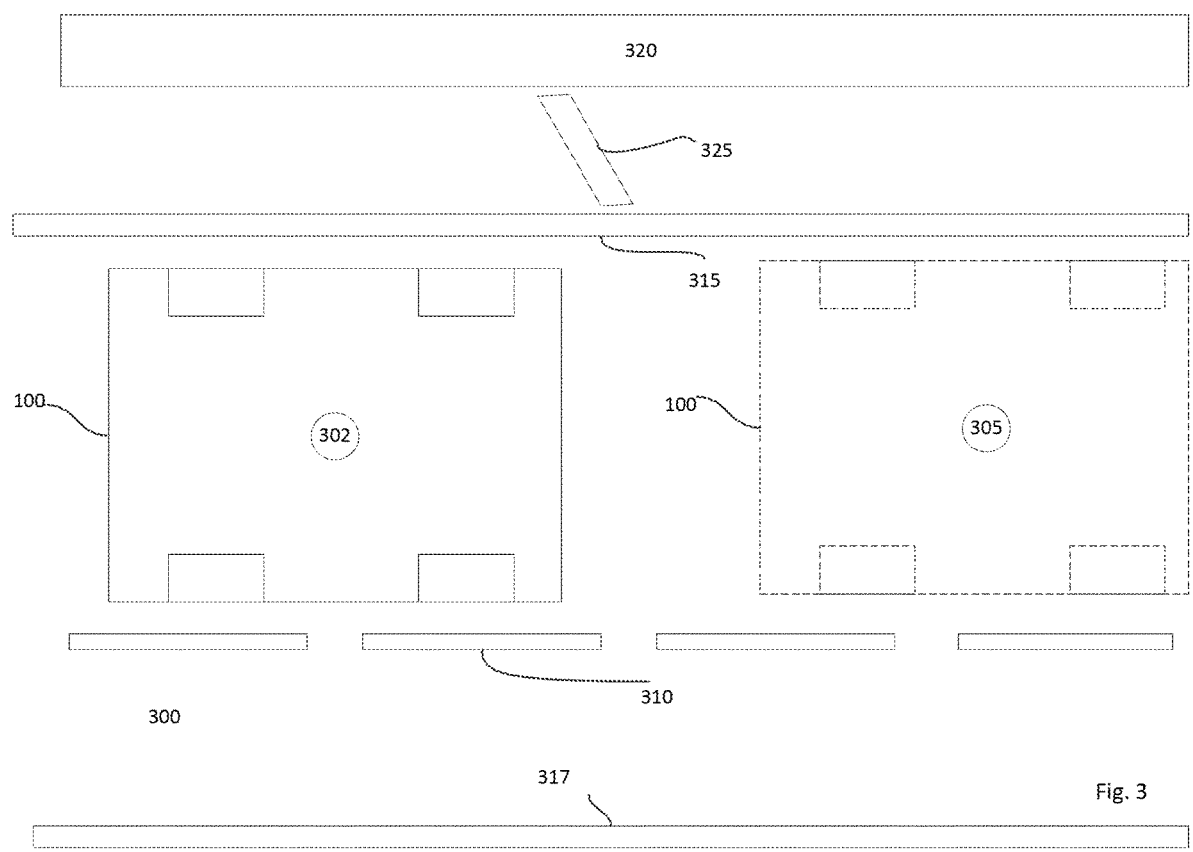
FIG. 3 is a block diagram of a vehicle traveling during a time in an example surrounding environment.

FIG. 3 is a block diagram of a vehicle 100 in an example surrounding environment 300. The vehicle 100 is depicted in a first position 302 (at a first time) and in a second position 305 (at a second later time). The electromagnetic radiation sensors (for example, sensors 202, 205, and 210) of the vehicle 100 detect the surrounding environment 300 of the vehicle 100 and elements in that environment ("environmental elements") including a dashed center line 310 (a "lane marking"), a solid line 315 (another "lane marking"), a solid line 317, a building 320, and a road sign 325. The electronic controller 110 uses elements that can be detected at the first position 302 and second position 305 to calculate the position of the vehicle 100. For example, the building 320, the dashed center line 310, solid line 315, and solid line 317 are used to calculate the vehicle's position at both times because they can be detected at the first position 302 and second position 305. Environmental elements that cannot be detected at the first position 302 and second position 305 are not used by the electronic controller 110 to calculate the position of the vehicle 100. For example, the road sign 325 is not used to calculate the vehicle's position because it cannot be detected at the first position 302 and second position 305.

Figure 4:
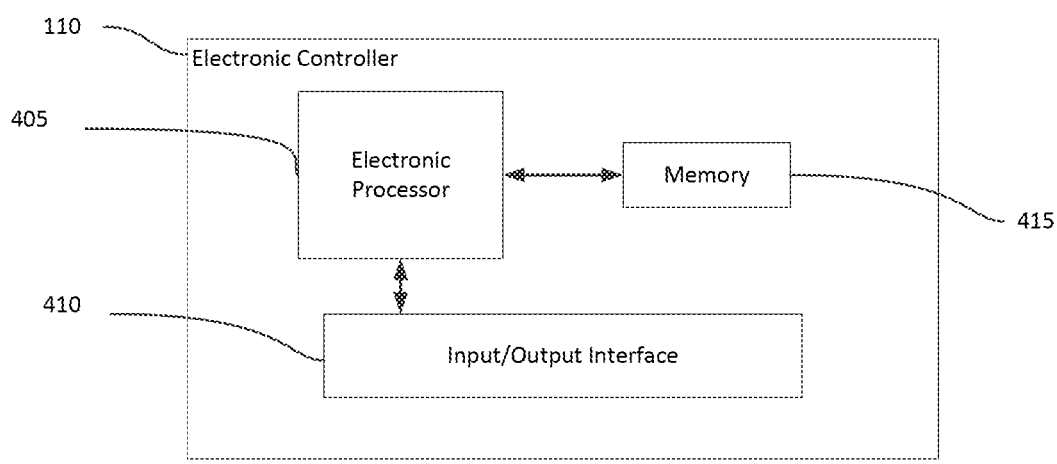
FIG. 4 is a block diagram of an electronic controller of the system of FIG. 1 and the system of FIG. 2.

FIG. 4 is a block diagram of the electronic controller 110 of the systems of FIG. 1 and FIG. 2. The electronic controller 110 includes a plurality of electrical and electronic components that provide power, operation control, and protection to the components and modules within the electronic controller 110. The electronic controller 110 includes, among other things, an electronic processor 405 (such as a programmable electronic microprocessor, microcontroller, or similar device), a memory 415 (for example, non-transitory, machine readable memory), and an input/output interface 410. The electronic processor 405 is communicatively connected to the memory 415 and the input/output interface 410. The electronic processor 405, in coordination with the memory 415 and the input/output interface 410, is configured to implement, among other things, the methods described herein.

The electronic controller 110 may be implemented in several independent controllers (for example, programmable electronic controllers) each configured to perform specific functions or sub-functions. Additionally, the electronic controller 110 may contain sub-modules that include additional electronic processors, memory, or application specific integrated circuits (ASICs) for handling input/output functions, processing of signals, and application of the methods listed below. In other embodiments, the electronic controller 110 includes additional, fewer, or different components.

Figure 5:
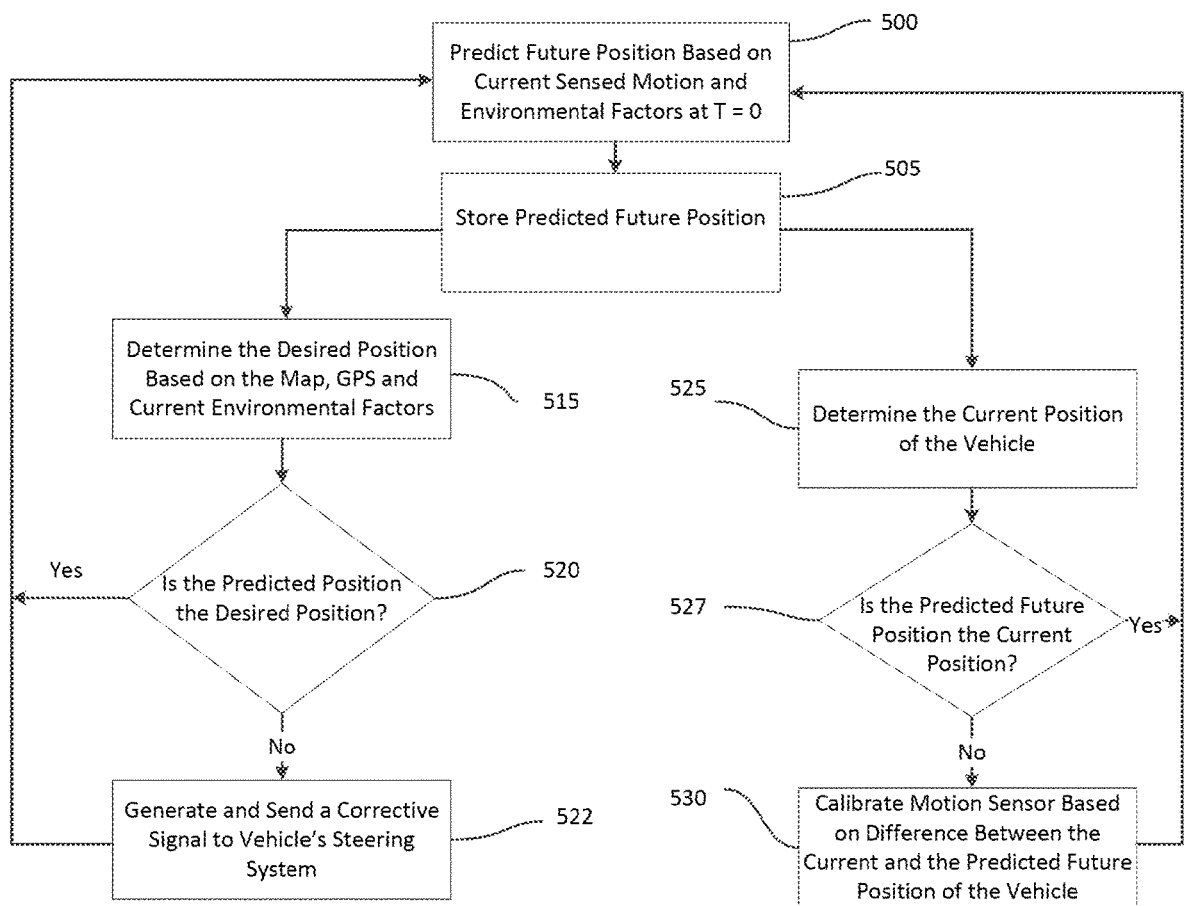
FIG. 5 is a flowchart of a method of calibrating the motion sensors of FIG. 1 based on data from the system of FIG. 2 and calibrating the motion of the vehicle so that the position predicted by the systems of FIG. 1

FIG. 5 illustrates a method of centering a vehicle in a lane using the system 105 for sensing motion and controlling the vehicle's position and the system 200 for sensing environmental information regarding an environment external to the vehicle 100. In a general sense, the method performs a first task and a second task in parallel in order to center the vehicle 100 in the lane. In the illustrated method, the electronic processor 405 predicts the future position of the vehicle 100 relative to elements in the vehicle's future surrounding environment (block 500). The predicted position is calculated based on the vehicle's current motion (first motion) and surrounding environmental elements. In some embodiments, environmental elements that are used to determine the vehicle's position include stationary infrastructure and road markings present at the vehicle's predicted position and the vehicle's current position. The predicted position is stored in the memory 415 of the electrical controller 110 as a location on the map 220 or as a set of variables describing the location relative to the environment (blocks 505).

The first task is correcting the vehicle's motion so that the vehicle 100 moves to a desired position. In one example, the desired position is defined as the position where the vehicle 100 is centered in the lane. The electronic processor 405 uses the input from the radar sensor 202, video camera 205, lidar sensor 210, and global positioning system 215 to determine the geographical position of the vehicle 100 on the map 220. Using the map 220 and information from the system 105 the electronic processor 405 determines the desired position (block 515). The electronic processor 405 compares the predicted position of the vehicle 100 to the desired position of the vehicle 100 (block 520). If there are differences between the desired position and the predicted position a corrective signal is generated by the electronic controller 110 and sent to components that directly (for example, by adjusting the angle, relative to the front of the vehicle 100, of the front wheels' axis) or indirectly (for example, by differential braking) control the steering angle of the vehicle 100 (block 522). The corrective signal causes an adjustment to be made to the vehicle's motion. The adjustment to the vehicle's motion ensures that the desired position and future position will be the same.

The second task is to determine if and how the system 105 for sensing motion and controlling the vehicle's position needs to be calibrated. At the time the vehicle 100 should have reached the predicted position, the current position of the vehicle 100 is determined relative to elements in the vehicle's current surrounding environment (block 525). The predicted position is retrieved from the electronic controller's memory 415. The predicted position of the vehicle 100 and the current position of the vehicle 100 are then compared (block 527). Differences between the predicted position and the current position indicate that the motion sensors are calibrated incorrectly. The motion sensors are recalibrated based on the differences between the vehicle's current position and the vehicle's predicted position (block 530). If the predicted position were recalculated given the data from the recalibrated motion sensors the predicted position and current position of the vehicle 100 would be the same. The second task is performed while the first task compares a second predicted position of the vehicle to a second desired position of the vehicle to generate a second corrective signal and sends the second corrective signal to the steering system of the vehicle 100.

Various features, advantages, and embodiments are set forth in the following claims.

What is claimed is:

1. A system for centering a vehicle in a lane, the system comprising:

an electromagnetic radiation sensor;
a motion sensor;
a steering system; and
an electronic controller configured to,
receive environmental information regarding an environment external to the vehicle from the electromagnetic radiation sensor,
receive a first motion of the vehicle from the motion sensor,
at a first time
determine a predicted position of the vehicle based on the first motion of the vehicle and the environmental information,
store the predicted position of the vehicle in memory, compare the predicted position of the vehicle to a desired position of the vehicle to generate a corrective signal, send the corrective signal to the steering system of the vehicle, and determine a second time when the vehicle should reach the predicted position, and at the second time determine a current position of the vehicle, compare the current position of the vehicle with the predicted position of the vehicle to generate a difference, and calibrate the motion sensor based on the difference, wherein the motion sensor is one selected from the group comprising a steering angle sensor, a 3-dimensional accelerometer, and a gyroscope.

2. The system according to claim 1, wherein the desired position is a future position of the vehicle where the vehicle is centered in the lane.

3. The system according to claim 1, wherein the electromagnetic radiation sensor is at least one from the group consisting of a radar sensor, video camera, and lidar sensor.

4. The system according to claim 1, wherein the corrective signal includes an adjustment to a steering angle of the vehicle that causes the vehicle to reach the desired position at a future point in time.

5. The system according to claim 1, wherein the predicted position is stored as a location on a map or as a set of variables describing the location relative to the environment.

6. The system according to claim 1, wherein the electronic processor is configured to determine the desired position using a map of a geographical area surrounding the vehicle and the received environmental information.

7. A method of centering a vehicle in a lane, the method comprising:

sensing, with an electromagnetic radiation sensor, environmental information regarding an environment external to the vehicle;

sensing, with a motion sensor, a first motion of the vehicle;

at a first time determining, with an electronic controller, a predicted position of the vehicle based the first motion of the vehicle and the environmental information;

storing the predicted position of the vehicle in memory;

comparing the predicted position of the vehicle to a desired position of the vehicle to generate a corrective signal;

sending the corrective signal to a steering system of the vehicle; and determine a second time when the vehicle should reach the predicted position, and at the second time determining a current position of the vehicle;

comparing the current position of the vehicle with the predicted position of the vehicle to generate a difference;

calibrating the motion sensor based on the difference, wherein the motion sensor is one selected from the group comprising a steering angle sensor, a 3-dimensional accelerometer, and a gyroscope.

8. The method according to claim 7, wherein the electromagnetic radiation sensor is at least one from the group consisting of a radar sensor, video camera, and lidar sensor.

9. The method according to claim 7, wherein the desired position is a future position of the vehicle where the vehicle is centered in the lane.

10. The method according to claim 7, method further comprising determining the desired position using a map of a geographical area surrounding the vehicle and the received environmental information.

11. The method according to claim 7, wherein the corrective signal includes an adjustment to a steering angle of the vehicle that causes the vehicle to reach the desired position at a future point in time.

12. The method according to claim 7, wherein the predicted position is stored as a location on a map or as a set of variables describing the location relative to the environment external to the vehicle.

\* \* \* \* \*